United States Patent [19]

Costanzi et al.

[11] Patent Number: 5,051,458

[45] Date of Patent: Sep. 24, 1991

[54] UV STABILIZERS FOR ORGANIC POLYMERS

[75] Inventors: Silvestro Costanzi; Luigi Cassar; Carlo Bosetto; Carlo Neri; Damiano Gussoni, all of Milan, Italy

[73] Assignee: Enichem Synthesis S.p.A., Palermo, Italy

[21] Appl. No.: 353,097

[22] Filed: May 17, 1989

[30] Foreign Application Priority Data

May 27, 1988 [IT]  Italy ............................... 20762 A/88

[51] Int. Cl.[5] ................................................. C08K 5/34
[52] U.S. Cl. ........................................ 524/99; 546/14; 528/27; 528/15; 528/18; 528/14; 528/19; 556/407; 556/425

[58] Field of Search ...................... 546/14; 528/27, 15, 528/18, 14, 19; 556/407, 425; 524/99

[56] References Cited

U.S. PATENT DOCUMENTS 4,859,759  8/1989  Maycock et al. ...................... 528/27
4,895,885  1/1990  Foster et al. ........................... 524/99

Primary Examiner—Melvyn I. Marquis
Attorney, Agent, or Firm—Hedman, Gibson, Costigan & Hoare

[57] ABSTRACT

Polymeric stabilizer compounds with a polyorganosiloxane structure suitable for stabilizing organic polymers against UV radiation and heat, containing sterically hindered piperidino groups in their molecule and easily prepared in well defined, predetermined structures.

30 Claims, No Drawings

UV STABILIZERS FOR ORGANIC POLYMERS

This invention relates to stabilizer compounds containing sterically hindered piperidino groups in the molecule and suitable for stabilizing organic polymers against ultraviolet radiation and heat.

The invention also relates to methods for preparing said stabilizer compounds and to the stabilized polymer compositions. Organic polymers are known to be subject to degradation with time on exposure to atmospheric agents and in particular to ultraviolet radiation, and to also suffer degradation during working and transformation processes due to the high temperatures reached. Such degradation manifests itself as a worsening of the organic polymer physical characteristics, such as a reduction in the ultimate tensile stress and flexibility, and alterations in the optical properties of a manufactured article.

It is usual to introduce stabilizer compounds into the organic polymer to oppose such degradation.

One class of compounds widely used for this purpose is the sterically hindered amine class. U.S. Pat. Nos. 4,325,864 and 4,346,188 describe for example the use of pyrrolidine derivatives as UV stabilizers, and U.S. Pat. No. 3,840,494 describes the use of esters of 2,2,6,6-tetraalkylpiperidin-4-ol. U.S. Pat. No. 4,684,726 and U.S. patent application Ser. No. 103,961 filed Oct. 5, 1987, now U.S. Pat. No. 4,946,880 describe pyrrolidine, morpholine and piperidine derivatives also introducing a hydrolysable silylated function to the molecule. On hydrolysing the silylated function, these compounds give rise to complex resin structures able to permanently remain within the organic polymer in which they are incorporated.

However, such resinification is not easily controllable especially when effected within polymers to be stabilized.

A class of stabilizer compounds of polymer type containing sterically hindered piperidino groups has now been discovered which can be easily prepared in the form of well defined predetermined structures enabling the aforesaid drawback to be obviated.

The present invention therefore relates to such polymeric stabilizer compounds containing sterically hindered piperidino groups.

The invention also relates to methods for preparing said stabilizer compounds.

The invention further relates to polymer compositions stabilized by said polymeric stabilizer compounds.

In particular, the stabilizer compounds of the present invention are polymers definable by the following general formula:

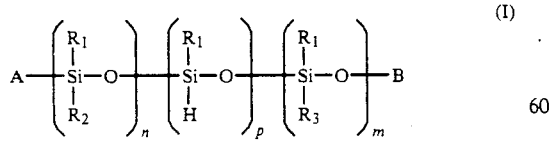
(I)

where:
$R_1$ and $R_3$, which can be the same or different, are linear or branched $C_1$-$C_{10}$ alkyl radicals or $C_5$-$C_{11}$ cycloaliphatic radicals or phenyl radicals;
$R_2$ is a radical chosen from those corresponding to the following formula:

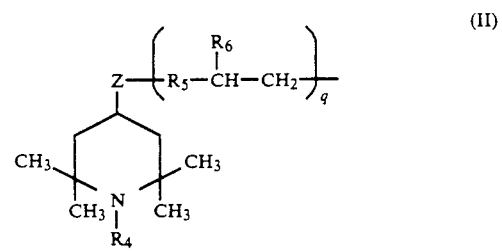
(II)

in which:
$R_4$ is hydrogen or methyl or benzyl;
$R_5$ is a linear or branched $C_1$-$C_7$ alkyl radical;
Z is a group chosen from:

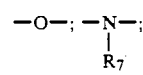

(where $R_7$ is a linear or branched $C_1$-$C_5$ alkyl group or hydrogen);
$R_6$ is hydrogen or methyl;
q is zero or one;
n is a whole number;
m and p, which can be the same or different, are zero or whole numbers, with the condition that n+p+m is a whole number less than or equal to 50;
A is a group corresponding to the formula:

(III)

where $R_1$ has the aforesaid meaning;
B is a group corresponding to the formula:

(IV)

where $R_1$ has the aforesaid meaning; or
A and B jointly represent a direct bond, giving rise to a cyclic structure.

The stabilizers of the present invention, corresponding to said formula (I), are polymers having random distribution of the monomer units and a linear or cyclic structure.

In particular, they assume a linear structure when A and B are groups corresponding to formulas (III) and (IV), whereas they assume a cyclic structure when A and B jointly represent a direct bond.

In the case of a linear structure, stabilizers are preferred in which the total number of monomer units (n+p+m) ranges from 10 to 50, while in the case of a cyclic structure stabilizers are preferred in which m and p are zero and n varies from 4 to 7.

In particular, in the case of stabilizers with a linear structure, a more preferred class is that in which:
$R_1$ is $CH_3$;
$R_2$ is the group corresponding to the formula:

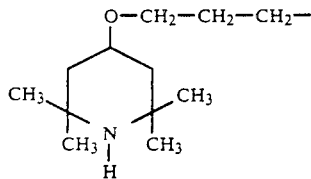 (V)

p is zero;
m and n vary from 5 to 15.

A second more preferred class is that in which:
$R_1$ and $R_3$ are $CH_3$;
$R_2$ is the group of formula (V);
p and m are zero;
n varies from 30 to 40.

A third more preferred class is that in which:
$R_1$ is $CH_3$;
$R_2$ is the group of formula (V);
$R_3$ is $-CH_2-(CH_3)_7$;
p is zero;
m and n vary from 15 to 20.

A fourth more preferred class is that in which:
$R_1$ is $CH_3$;
$R_2$ is the group of formula (V);
m is zero;
p varies from 5 to 12;
n varies from 25 to 30.

A fifth more preferred class is that in which:
$R_1$ and $R_3$ are $CH_3$;
$R_2$ is the group corresponding to the formula:

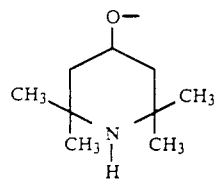

p is zero;
n varies from 20 to 25—m varies from 8 to 10;

In the case of stabilizers of cyclic structure, a more preferred class is that in which:
$R_1$ is $CH_3$;
$R_2$ is the group of formula (V);
p and m are zero;
n varies from 4 to 7.

The polymeric stabilizer compounds of the present invention in which $R_2$ corresponds to formula (II) where q is one, can be prepared by bringing a polyorganosiloxane compound corresponding to the formula:

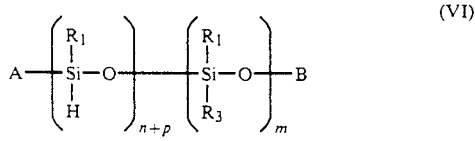 (VI)

where A, B, $R_1$, $R_3$, n, p and m have the aforesaid meanings, into contact under reaction conditions with an unsaturated piperidino compound corresponding to the formula:

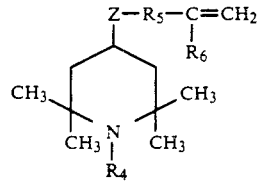 VII in which $R_4$, $R_5$, $R_6$ and z have the aforesaid meanings, until between 1 and n+p Si—H groups present in (VI) have undergone reaction.

The Si—H groups of the polyorganosiloxane compound (VI) constitute the reactive sites to which the unsaturated piperidino compound (VII) binds.

All the said Si—H groups can be made to react, to give rise to stabilizer compounds in which p is zero in formula (I), or alternatively only some of them may be reacted to give rise to stabilizer compounds in which free Si—H groups are still present (p is a whole number in formula I).

Consequently, according to the present invention the reaction is conducted until between 1 and n+p Si—H groups have been reacted, the reaction generally being brought to completion by using a piperidino compound quantity of up to 25% molar excess over the amount of substitution to be obtained.

The reaction is conducted at a temperature of between 0° and 140° C. and preferably between 80° and 120° C. for a time period of between 1 and 10 hours, using as catalyst a complex of a noble metal chosen from Pt and Rh, for example hexachloroplatinic acid ($H_2PtCl_6$) or rhodiumchloridetriphenylphosphine [$RhCl(PPh_3)_3$].

The catalyst concentration, evaluated as metal concentration, can vary from 1 to 200 parts per million (ppm) in the reaction medium and preferably between 5 and 50 ppm.

The reaction can be conveniently conducted in the absence of solvent or in the presence of an inert organic solvent chosen from aliphatic, cycloaliphatic or aromatic hydrocarbons, such as heptane, cyclohexane or toluene. On termination of the reaction, any solvent and the excess reagent are removed by evaporation under vacuum, and the stabilizer compound is obtained as residue.

The unsaturated piperidino compounds corresponding to formula (VII) can be prepared by known methods such as described in the U.S. patent application Ser. No. 044,986 filed May 1, 1987 whereas the polyorganosiloxane compounds (VI) are readily available commercially.

Those stabilizer compounds of the present invention in which $R_2$ is represented by formula (II) where q is zero can be obtained by bringing a polyorganosiloxane compound corresponding to the aforesaid formula (VI) into contact under reaction conditions with a piperidino compound corresponding to the following formula:

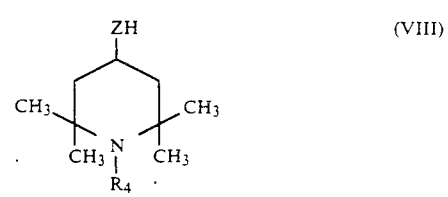 (VIII)

where Z and $R_4$ have the aforesaid meanings, until between 1 and n+p Si—H groups present in compound (VI) have undergone reaction.

According to the present invention the reaction is conducted at a temperature of between 20° and 150° C. and preferably between 60° and 120° C. for a reaction time of between 1 and 10 hours.

The reaction is continued until between 1 and n+p Si—H groups present in the polyorganosiloxane compound (VI) have been reacted, the reaction generally being brought to completion by using a piperidino compound quantity of up to 10% molar excess over the amount of substitution to be obtained.

The catalysts used are metallic alcoholates, preferably of alkali metals such as $CH_3ONa$, or are metal salts of fatty acids such as dibutyltin dilaurate or Zn octoate.

The catalyst quantity used ranges from 0.01 to 5 mol % of the piperidino compound (VIII) and preferably from 0.1 to 1 mol %. The reaction is conducted in the presence of an inert organic solvent chosen from aliphatic, cycloaliphatic and aromatic hydrocarbons such as heptane, cyclohexane and toluene.

According to a further embodiment of the present invention the polymeric stabilizer compounds of the invention in which $R_2$ is represented by formula (II) where Z is —O— and q is one can be prepared by a method comprising the following stages conducted in succession:

a) reacting a polyorganosiloxane compound represented by the aforesaid formula (VI) with an unsaturated compound corresponding to the following formula:

in which
X = Br or Cl;
$R_5$ and $R_6$ have the aforesaid meaning,
to give a polyorganosiloxane compound corresponding to the following formula:

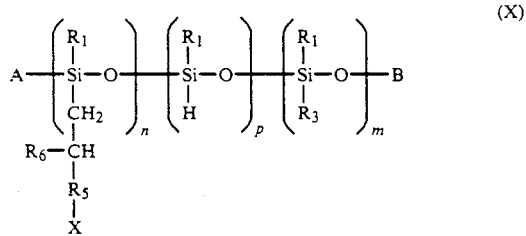

where $R_1$, $R_3$, $R_5$, $R_6$, A, B, X, n, p and m have the aforesaid meanings;

b) reacting compound (X) obtained in stage a) with a piperidino compound corresponding to the formula:

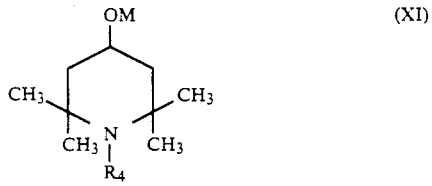

where $R_4$ has the aforesaid meaning, and M is Na, K or Li. In stage a) the procedure is conducted at a temperature of between 0° and 140° C. and preferably between 80° and 120° C. for a time of between 1 and 10 hours, generally using an excess of the unsaturated compound (IX) of up to 25% over the extent of substitution to be obtained. The catalyst used is a noble metal complex, preferably of Pt or Rh, for example hexachloroplatinic acid ($H_2PtCl_6$) or rhodiumchloridetriphenylphosphine [$RhCl(PPH_3)_3$]. The catalyst concentration expressed as metal is between 1 and 200 parts per million (ppm) in the reaction medium and preferably between 5 and 50 ppm.

The reaction is generally conducted in the presence of an inert organic solvent chosen from aliphatic, cycloaliphatic and aromatic hydrocarbons, such as heptane, cyclohexane or toluene.

The solvent and the excess reagent (IX) are then removed by evaporation under vacuum, the compound (X) being obtained as residue.

In accordance with stage b) said compound (X) is then reacted with the piperidino compound (XI) used in stoichiometric quantity with respect to compound (IX).

The reaction is conducted in the presence of an inert organic solvent, generally the same as that used in stage a), at a temperature of between 20° and 80° C. for a time of between 4 and 10 hours.

The final product is then recovered by adding water, extracting with an organic solvent and evaporating the solvent.

The stabilizer compounds of the present invention can be used for stabilizing organic polymers in general against the degradative action of ultraviolet radiation and heat.

Organic polymers particularly suitable for this purpose are olefin polymers such as polypropylene, low and high density polyethylene, low density linear polyethylene, polybutadiene; olefin and diolefin copolymers and terpolymers such as ethylene-propylene copolymers, ethylene-propylene-norbonene terpolymers; copolymers of olefins with vinyl monomers such as ethylene-vinylacetate copolymers; polystyrene; copolymers and terpolymers of styrene with dienes or acrylic monomers such as styrene-butadiene copolymers, styrene-acrylonitrile copolymers and acrylonitrilebutadiene-styrene terpolymers.

Said stabilizer compounds can also be advantageously used in stabilizing urethane polymers, which can form the basis of surface coatings such as paints or lacquers.

The quantity of stabilizer compound required to obtain a stabilized polymer composition according to the present invention is such as to provide the composition with between 0.0005 and 0.27% by weight of active nitrogen and preferably between 0.003 and 0.05%, the active nitrogen being the nitrogen of the piperidine ring.

In practice, the quantity of stabilizer compound which can be added to the organic polymer ranges from 0.01 to 5% by weight of the organic polymer, and preferably between 0.05 and 1%. The stabilizer compounds of the present invention can be introduced into the polymer to be stabilized by the normal methods used to incorporate additives.

For example, according to one embodiment of the present invention, the stabilizers can be added to the organic polymer in the final desired quantity and these then mixed in a mixer, such as of Bambury type.

Alternatively, the organic polymer in powder form can be mixed with a quantity of stabilizer compound of about 10-20% by weight of the organic polymer, the stabilized polymer compositions then being prepared by suitably diluting said mixture.

According to a further embodiment of the present invention the stabilizer compounds can be introduced into the organic polymer as solutions or dispersions in a solvent or dispersing agent, which is then removed after mixing.

Said stabilizer compounds can also be introduced into the polymer to be stabilized during the preparation of this latter, generally when it is in the lattice state, to obtain prestabilized organic polymers in this manner.

Those stabilizer compounds of the present invention which still contain free Si—H groups can also be fixed to a solid support containing surface hydroxyl groups.

Supports suitable for this purpose are siliceous materials of natural or synthetic origin such as silica gel, glass fibre, talc, kaolin, mica, celite or diatomaceous earth, or other products used as fillers and pigments for plastics, such as titanium dioxide.

Adhesion to the support is obtained in practice by bringing the support in powder or granule form into contact with a solution of the stabilizer compound in an inert organic solvent such as an aliphatic, cycloaliphatic or aromatic hydrocarbon, at a temperature between ambient (20°-25° C.) and 100° C. for a time of between 1 and 10 hours.

The thus supported stabilizer is added to the organic polymer to be stabilized using the normal filler incorporation methods. Those stabilizers of the present invention which contain free Si—H groups can also be used to cover finished manufactured articles having hydroxyl groups on their surface, such as cotton prints. In this manner it is also possible to benefit from the intrinsic hydrophobic properties of polyorganosiloxanes, to give the manufactured article water-repellent properties as well as stability towards light.

If desired, the stabilized polymer compositions of the present invention can also contain other UV stabilizers and/or one or more other additives commonly used in the art, such as phenolic antioxidants, phosphite-based stabilizers, UV radiation absorbers and peroxide decomposers in a quantity ranging from 0.07 to 5% by weight of the organic polymer.

The examples given below are for illustrative purposes only and are not to be considered limitative of the scope of the invention.

EXAMPLE 1

Preparation of Compound XII

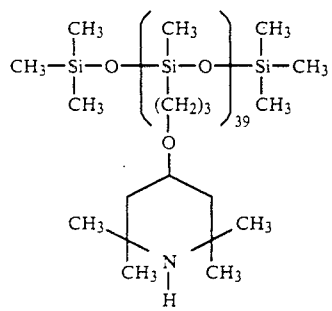

25 g (0.01 moles) of polymethylhydrogensiloxane of molecular weight 2500 (in formula XI: m=0, n+p=39, A=group of formula III, B=group of formula IV, $R_1$=CH$_3$) and 0.1 ml of a solution obtained by dissolving 1 g of H$_2$PtCl$_6$.6H$_2$O in 50 ml of isopropanol are introduced into a 200 ml reaction flask.

The solution obtained is heated to 85°-90° C. and 100 g (0.51 moles) of 2,2,6,6-tetramethyl-4-allyloxypiperidine are then added dropwise over a period of two hours.

After the addition, the reaction mixture is kept at 90° C. for 5 hours.

The excess 2,2,6,6-tetramethyl-4-allyloxypiperidine and the volatile byproducts are then removed by evaporation under vacuum (0.1 mmHg) at 180° C.

103 g of a colourless or slightly straw coloured liquid are obtained corresponding to the compound of formula XII. The structure was confirmed by IR and NMR spectroscopy. Elementary analysis gave the following results:

|  | Si | N | C | H |
|---|---|---|---|---|
| Theoretical (%) | 11.2 | 5.3 | 60.7 | 10.6 |
| Experimental (%) | 11.5 | 5.1 | 62 | 11 |

EXAMPLE 2

Preparation of Compound XIII

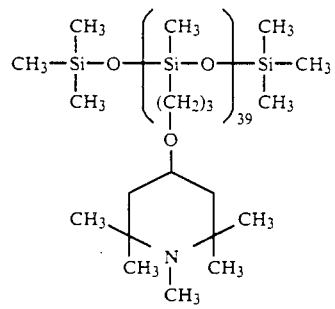

The procedure of Example 1 is followed, using 1,2,2,6,6-pentamethyl-4-allyloxypiperidine instead of 2,2,6,6-tetramethyl-4-allyloxypiperidine.

The polymer obtained corresponds to the compound of formula XIII. Elementary analysis gave the following results:

|  | Si | N | C | H |
|---|---|---|---|---|
| Theoretical (%) | 10.7 | 5.1 | 61.7 | 10.7 |
| Experimental (%) | 11 | 4.9 | 62.2 | 11.3 |

EXAMPLE 3

Preparation of Compound XIV

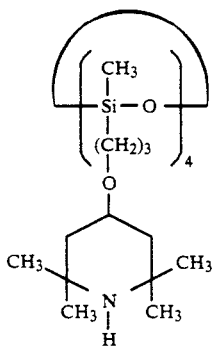

24 g (0.01 moles) of tetramethylcyclohydrogensiloxane (in formula X: m=0, n+p=4, $R_1$=$CH_3$, A and B are a direct bond) and 0.05 ml of a solution obtained by dissolving 1 g of $H_2PtCl_6.6H_2O$ in 50 ml of isopropanol are introduced into a 200 ml reaction flask fitted with a stirrer, thermometer, dropper and reflux condenser with a nitrogen head valve.

The solution obtained is heated to 90° C. and 98.5 g (0.5 moles) of 2,2,6,6-tetramethyl-4-allyloxypiperidine are then added dropwise over a period of two hours.

After the dropwise addition, the reaction mixture is kept at 90° C. for 5 hours, after which the volatile by-products and the excess 2,2,6,6-tetramethyl-4-allyloxypiperidine are then removed.

In this manner, 99.8 g of a colourless or slightly straw coloured viscous liquid product not further subjectable to distillation are obtained corresponding substantially to the compound of formula XIV. The structure was confirmed by NMR and IR spectroscopic analysis. Elementary analysis gave the following results:

|  | Si | N | C | H |
|---|---|---|---|---|
| Theoretical (%) | 10.8 | 5.4 | 60.7 | 10.5 |
| Experimental (%) | 11.2 | 5.1 | 53.7 | 11 |

EXAMPLE 4

Preparation of Compound XV

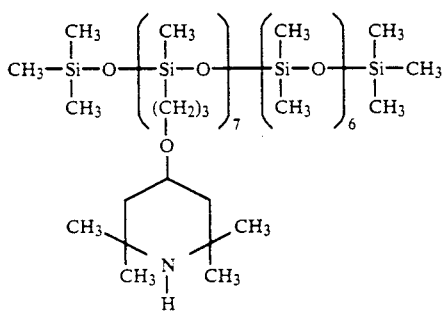

10 g (0.01 moles) of polymethylhydrogen-dimethylsiloxane copolymer of average molecular weight 1000 containing 50% by weight of each monomer (in formula XI: $R_1$=$CH_3$, $R_3$=$CH_3$, A is group III, B is group IV, n+p=7, m=6) and 0.05 ml of a solution obtained by dissolving 1 g of $H_2PtCl_6.6H_2O$ in 50 ml of isopropanol are introduced into a 50 ml reaction flask fitted with a stirrer, thermometer, dropper and reflux condenser with a nitrogen head valve.

The mixture obtained is heated to 95° C. and 19.7 g (0.1 moles) of 2,2,6,6-tetramethyl-4-allyloxypiperidine are then added dropwise over a period of one hour.

After the addition, the reaction mixture is kept stirring for 4 hours at 95° C., after which the excess 2,2,6,6-tetramethyl-4-allyloxypiperidine is removed under vacuum (0.1 mmHg) at 180° C. In this manner, 22.9 g of a slightly straw coloured polymer residue of viscous appearance are obtained corresponding to the compound of formula XV. The structure was confirmed by IR and NMR spectroscopic analysis.

The N content, obtained by elementary analysis, is 3.8% (theoretical 3.96%).

EXAMPLE 5

Preparation of Compound XVI

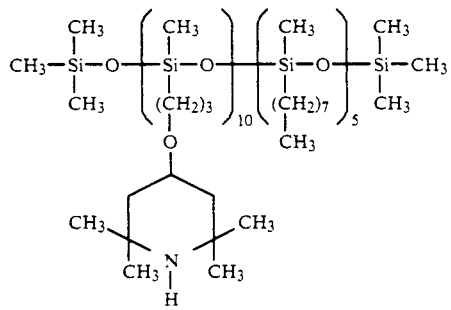

14.5 g (0.01 moles) of polymethylhydrogen-methyloctylsiloxane copolymer of average molecular weight 1400 containing 50% by weight of each monomer (in formula XI: $R_1$=$CH_3$, $R_3$=$C_8H_{17}$, A is group III, B is group IV, n+p=10, m=5), 25 g (0.126 moles) of 2,2,6,6-tetramethyl-4-allyloxypiperidine and 0.1 ml of a solution obtained by dissolving 1 g of $H_2PtCl_6.6H_2O$ in 50 ml of isopropanol are introduced into a 100 ml reaction flask.

The mixture obtained is heated to 100° C. and kept stirring for 5 hours.

After this period the unreacted 2,2,6,6-tetramethyl-4-allyloxypiperidine and the byproducts are removed by evaporation under vacuum (0.1 mmHg) at 180° C.

In this manner, 35 g of a polymer in the form of a colourless transparent oil are obtained corresponding to the compound of formula XVI.

The N content, obtained by elementary analysis, is 4.1% (theoretical 3.7%).

EXAMPLE 6

Preparation of Compound XVII

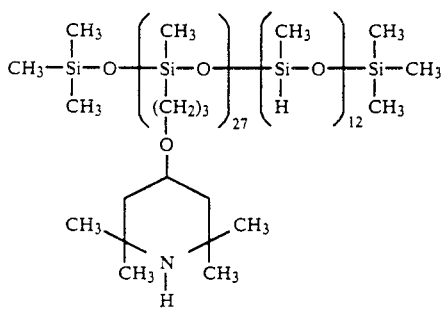

and Application of a Coating to Micromica 25 g (0.01 moles) of polymethylhydrogensiloxane of molecular weight 2500 (in formula XI: $R_1=CH_3$, A is group III, B is group IV, m=0, n+p=39), 70 g (0.35 moles) of 2,2,6,6-tetramethyl-4-allyloxypiperidine and 0.1 ml of a solution obtained by dissolving 1 g of $H_2PtCl_6.6H_2O$ in 50 ml of isopropanol are introduced into a 250 ml reaction flask fitted with a stirrer, thermometer, dropping funnel and bulb condenser with a nitrogen head valve.

The mixture obtained is heated to 85° C. and kept stirring for 5 hours at this temperature.

Finally the byproducts and the unreacted 2,2,6,6-tetramethyl-4-allyloxy-piperidine are removed by evaporation under vacuum (0.1 mmHg) at 180° C.

The obtained polymer still contains free Si—H groups, as can be seen from the IR analysis by observing the absorption band for 2140 $cm^{-1}$, and corresponds substantially to the compound of formula XVII.

Its N content, obtained by elementary analysis, is 4.5% (theoretical 4.9%).

3 g of compound XVII are then dissolved in 500 ml of toluene and introduced into a 1 liter flask fitted with a condenser. To this are added 150 g of untreated mica of Phlogopite type (produced by Kemira) of mean particle diameter 40 μm and density of 0.4 g/ml.

The mixture obtained is then heated to boiling for 4 hours, after which the solvent is removed by evaporation under vacuum. The solid residue is finally dried under vacuum in an oven at 130°-140° C. for 4 hours.

EXAMPLE 7

Addition of Compounds XII, XIII, XIV, XV, XVI and XVII to polypropylene

Each of the stabilized compounds prepared as described in Examples 1-5 was mixed with commerical polypropylene (PP) of Moplen FLF20 type (marketed by Himont, MFI at 230° C.=12.5), using 10 parts by weight of stabilizer compound per 100 parts of previously powdered polypropylene.

Mixing was effected by heating the components to 90° C. for 1 hour in a powder mixer.

The master batches obtained in this manner were then diluted with further polypropylene to obtain, from each one, mixtures containing 0.5, 0.25 and 0.1 parts by weight of stabilizer compound per 100 parts of polypropylene.

Two commercial antioxidants (ANOX 20 and ALKANOX 240) were then added to each mixture in a quantity of 0.05 parts by weight per 100 parts of polypropylene (phr, parts per hundred parts of resin) and mixed in at ambient temperature. For comparison, polypropylene mixtures were also prepared containing only said commercial antioxidants, and further mixtures containing said antioxidants and the products Tinuvin 770 or Chimassorb 944 (Registered Trade Mark by Ciba-Geigy) as UV stabilizers in quantities of 0.5, 0.25 and 0.1 parts per hundred.

All the mixtures obtained as heretofore described were then passed through a Brabender laboratory extruder operating under the following conditions:

T=125°-185°-200°-210°-220° C.

Screw speed=20 r.p.m.

The extruded polymers were then cut into granules and again extruded operating in the same extruder provided with a flat head. In this manner films of 50 μm thickness were obtained and exposed to UV radiation using a WOM ATLAS CI 65 apparatus operating under the following conditions:

black panel temperature—60° C.
relative humidity—50%
cycle—all light

The brittling times for the various prepared films are given in the following table:

|  | 0.1 pph | | 0.25 pph | | 0.5 pph | |
|---|---|---|---|---|---|---|
| Polymer film | Active N (%) | Brittl. time (h) | Active N (%) | Brittl. time (h) | Active N (%) | Brittl. time (h) |
| Comparison PP | — | 150 | — | 150 | — | 150 |
| PP + Tinuvin 770 | 0.0056 | 520 | 0.014 | 780 | 0.028 | 1100 |
| PP + Chimassorb 944 (R.T.M.) | 0.0046 | 680 | 0.0115 | 920 | 0.023 | 1450 |
| PP + compound XII | 0.005 | 850 | 0.0125 | 1250 | 0.025 | 2120 |
| PP + compound XIII | 0.005 | 470 | 0.0125 | 700 | 0.025 | 1500 |
| PP + compound XIV | 0.005 | 780 | 0.0125 | 1000 | 0.025 | 1830 |
| PP + compound XV | 0.004 | 470 | 0.01 | 700 | 0.02 | 1250 |
| PP + compound XVI | 0.004 | 550 | 0.01 | 730 | 0.02 | 1400 |

We claim:

1. A polymeric stabilizer compound definable by the following general formula:

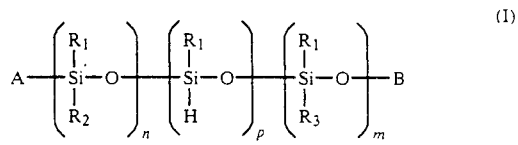

where:

$R_1$ and $R_3$, which can be the same or different, are linear or branched $C_1$-$C_{10}$ alkyl radicals or $C_5$-$C_{11}$ cycloaliphatic radicals or phenyl radicals;

R2 is a radical chosen from those corresponding to the following formula:

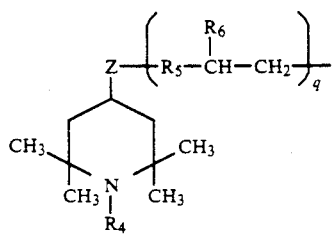
(II)

in which:
R4 is hydrogen or methyl or benzyl;
R5 is a linear or branched $C_1$-$C_7$ alkyl radical;
R6 is hydrogen or methyl;
Z is a group chosen from

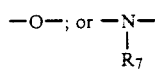

where R7 is a linear or branched $C_1$-$C_5$ alkyl group or hydrogen;
q is zero or one;
n is a whole number other than zero;
m and p, which can be the same or different, are zero or whole numbers, with the condition that n+p+m is less than or equal to 50;
A is a group corresponding to the formula:

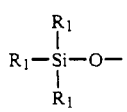
(III)

where R1 has the aforesaid meaning;
B is a group corresponding to the formula:

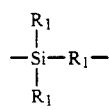
(IV)

where R1 has the aforesaid meaning; or A and B jointly represent a direct bond which represents a cyclic structure.

2. A stabilizer compound as defined in claim 1, characterized in that in formula (I) A is a group corresponding to formula (III), B is a group corresponding to formula (IV), and n+m+p is between 10 and 50.

3. A stabilizer compound as defined in claim 2, wherein in formula (I), R1 and R3 are CH3, R2 is the group corresponding to the formula:

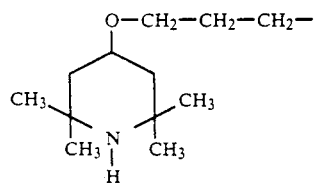
(V)

p is zero, and n and m vary from 5 to 15.

4. A stabilizer compound as defined in claim 2, wherein in formula (I), R1 is CH3, R2 is the group corresponding to the formula

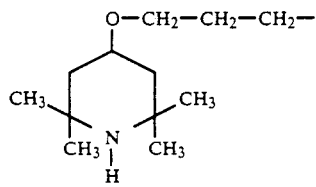
(V)

n varies from 30 to 40, and p and m are zero.

5. A stabilizer compound as defined in claim 2, wherein in formula (I), R1 is CH3, R2 is the group corresponding to the formula

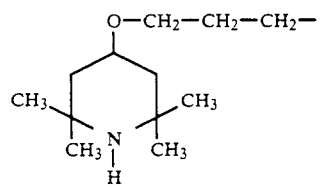
(V)

R3 is —(CH2)7—CH3, p is zero, and m and n vary from 15 to 20.

6. A stabilizer compound as defined in claim 2, wherein in formula (I), R1 is CH3, R2 is the group corresponding to the formula

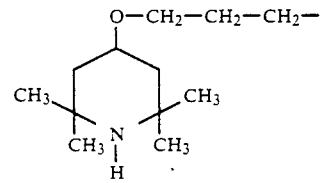
(V)

m is zero, p varies from 5 to 12 and n varies from 25 to 30.

7. A stabilizer compound as defined in claim 2, characterized in that in formula (I), R1 and R3 are CH3, R2 is the group:

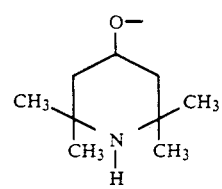

where p is zero, n varies from 20 to 25, and m varies from 8 to 10.

8. A stabilizer compound as defined in claim 1, wherein in formula (I), A and B jointly represent a direct bond, m and p are zero, and n varies from 4 to 7.

9. A stabilizer compound as defined in claim 8, wherein in formula (I), R1 is CH3 and R2 is the group corresponding to the formula

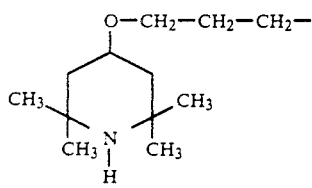
(V)

10. A method for preparing a stabilizer compound as defined in claim 1 in which $R_2$ is represented by formula (II) where q is one, characterized by bringing a polyorganosiloxane compound corresponding to the formula:

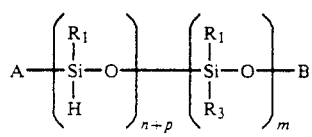
(VI)

where A, B, $R_1$, $R_3$, n, p and m are as defined in claim 1, into contact at a temperature of between 0° and 140° C. in the presence of a catalyst chosen from a complex of a noble metal selected from the group consisting of platinum and rhodium in a concentration, expressed as metal, of between 1 and 200 ppm in the reaction medium, in the absence of solvent or in the presence of an inert organic solvent, for a time of between 1 and 10 hours, with an unsaturated piperidino compound corresponding to the formula:

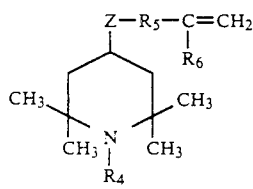
(VII)

in which $R_4$, $R_5$, $R_6$ and Z are as defined in claim 1, until between 1 and n+p Si—H groups present in (VI) have undergone reaction.

11. A method as defined in claim 10, characterized by operating at temperature of between 80° and 120° C. in the absence of a solvent and in the presence of a catalyst chosen from Rh or Pt complexes in a concentration, expressed as metal, of between 5 and 50 ppm in the reaction medium.

12. A method as defined in claim 10, characterized in that the catalyst is hexachloroplatinic acid or rhodiumchloridephenylphosphine.

13. A method as defined in claim 10, characterized in that the inert organic solvent is chosen from aliphatic, cycloaliphatic or aromatic hydrocarbons.

14. A method as claimed in claim 13, characterised in that the solvent is toluene, heptane or cyclohexane.

15. A method for preparing a stabilizer compound as defined in claim 1 in which $R_2$ is represented by formula (II) where q is zero, comprising contacting a polyorganosiloxane compound of formula (VI):

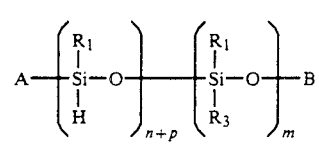
(VI)

in which $R_1$, $R_3$, A, B, n, p and m are as defined in claim 1 at a temperature of between 20° and 150° C. in the presence of a catalyst chosen from metallic alcoholates or metal salts of fatty acids in a quantity of between 0.01 and 5 mol % of compound (VIII), in the presence of an inert organic solvent chosen from aliphatic, cycloaliphatic or aromatic hydrocarbons, for a time of between 1 and 10 hours with a piperidino compound corresponding to the formula:

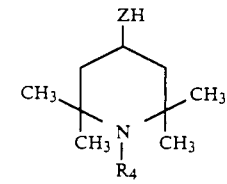
(VIII)

in which Z and $R_4$ are as defined as in claim 1, until between 1 and n+p Si—H groups present in (VI) have undergone reaction.

16. A method as defined in claim 15, characterized by operating at a temperature of between 60° and 120° C., using a catalyst quantity of between 0.1 and 1 mol % of compound (VIII).

17. A method as defined in claim 15, characterized in that the catalyst is chosen from sodium methylate, zinc octoate or tin octoate.

18. A method as defined in claim 15, characterized in that the solvent is cyclohexane, heptane or toluene.

19. A method for preparing a stabilizer compound as defined in claim 1 in which $R_2$ is represented by formula (II) where Z is —O— and q is one, comprising the following stages conducted in succession:
  a) reacting a polyorganosiloxane compound of the formula:

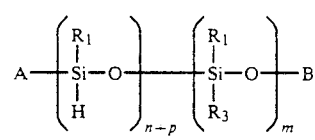
(VI)

wherein A, B, $R_1$, $R_3$, n, p, and m are as defined in claim 1 with an unsaturated compound corresponding to the formula:

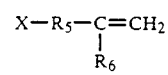
(IX)

in which $R_5$ and $R_6$ are as defined in claim 1, and X=Cl or Br, at a temperature of between 80° and 120° C. for a time of between 1 and 10 hours in the presence of an inert organic solvent chosen from aliphatic, cycloaliphatic or aromatic hydrocarbons, in the presence of a catalyst chosen from a complex of a noble metal selected from the group consisting of platinum and rhodium at a concentration, expressed as metal, of between 1 and 200 ppm in the reaction, to give a polyorganosiloxane compound corresponding to the following formula:

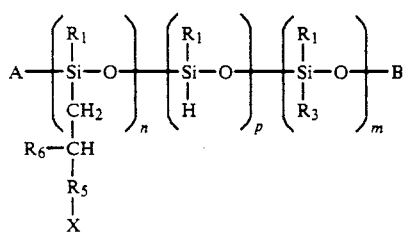

(X)

where $R_1$, $R_3$, $R_5$, $R_6$, A, B, X, n, p and m have the aforesaid meanings;

b) reacting compound (X) obtained in stage a) with a piperidino compound corresponding to the formula:

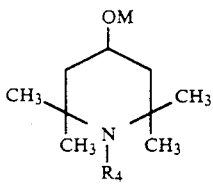

(XI)

where $R_4$ is as defined in claim 1, and M is Na, K or Li at a temperature of between 25° and 80° C. for a time of between 4 and 10 hours using a quantity of compound (XI) which is stoichiometric with respect to compound (IX), in the presence of an inert organic solvent chosen from aliphatic, cycloaliphatic or aromatic hydrocarbons.

20. A method as defined in claim 19, characterized by operating stage a) at a temperature of between 80° and 120° C. in the presence of a catalyst selected from a Pt or Rh complex in a concentration of between 5 and 50 ppm in the reaction medium.

21. A method as defined in claim 19, characterized in that the catalyst is hexachloroplatinic acid or rhodiumchloridephenylphosphine.

22. A method as defined in claim 19, characterized in that the inert solvent is toluene, heptane or cyclohexane.

23. A polymer composition comprising an organic polymer and a quantity of a UV and heat stabilizing compound as defined in claim 1 which provides between 0.0002 and 0.27% by weight of active nitrogen.

24. A polymer composition comprising an organic polymer and a quantity of a UV and heat stabilizing compound as defined in claim 1 which provides between 0.003 and 0.05% by weight of active nitrogen.

25. A stabilized polymer composition as defined in claim 23, which further comprises other UV stabilizers and/or one or more other additives selected from the group consisting of phenolic antioxidants, phosphite-based stabilizers, UV radiation absorbers and peroxide decomposers, in a quantity of between 0.07 and 5% by weight with respect to the organic polymer.

26. A stabilized polymer composition as defined in any one of claims 23 to 25, wherein said UV and heat stabilizing compound is fixed to a solid support containing surface hydroxyl groups.

27. A stabilized polymer composition as defined in claim 26, characterized in that the solid support is a natural or synthetic siliceous material or $TiO_2$.

28. A stabilized polymer composition as defined in claim 27, characterized in that the solid support is glass fiber, silica gel, talc, kaolin, mica, celite, diatomaceous earth or $TiO_2$.

29. A stabilized polymer composition as defined in claim 28, characterized in that the organic polymer is chosen from olefin or diolefin homopolymers, copolymers of olefins with vinyl monomers, polystyrene, copolymers of styrene with dienes or with acrylic monomers, or polyurethanes.

30. A stabilized polymer composition as defined in claim 29, characterized in that the organic polymer is polypropylene, low or high density polyethylene, polybutadiene or polyurethane.

* * * * *